United States Patent [19]

Nojiri et al.

[11] Patent Number: 4,991,692
[45] Date of Patent: Feb. 12, 1991

[54] SPILL CONTROL MOUNTING FOR DATA GATHERING SYSTEM

[75] Inventors: Howard H. Nojiri, Eugene, Oreg.; Nigel G. Mills, Worthington; James F. Million, Powell, both of Ohio; David L. Latimer, Eugene, Oreg.

[73] Assignee: Spectra-Physics, San Jose, Calif.

[21] Appl. No.: 328,230

[22] Filed: Mar. 24, 1989

[51] Int. Cl.⁵ .......................... A47F 9/04; G06K 7/10
[52] U.S. Cl. ......................................... 186/61; 235/462
[58] Field of Search .................. 186/61; 235/383, 462; 364/405, 567; 177/1, 50, 245

[56] References Cited

U.S. PATENT DOCUMENTS

| | | | |
|---|---|---|---|
| 4,064,954 | 12/1977 | Rock | 364/567 X |
| 4,656,344 | 4/1987 | Mergenthaler et al. | 235/462 |
| 4,700,656 | 10/1987 | Cone et al. | 235/462 X |
| 4,794,240 | 12/1988 | Schorr et al. | 235/462 X |

Primary Examiner—F. J. Bartuska
Attorney, Agent, or Firm—Killworth, Gottman, Hagan & Schaeff

[57] ABSTRACT

A spill control mounting arrangement for a data gathering system which is installed within a checkout counter comprises configuring the data gathering system in two parts, a first part of the system being mounted below an upper surface of the counter and a second part of the system being supported thereon. The footprint of the first part is smaller than the footprint of the second part such that the first part is substantially shielded from spilled liquids by the second part which is constructed to be impervious to such liquids. In particular, the first part may comprise a mounting channel extending across the counter and being substantially narrower in width than the second part, approximately one third the width. Components of the data gathering system are mounted within the channel for mechanical protection as well as protection from spilled liquids. A crowned channel cover can also be provided to prevent a substantial portion of any spilled liquids from entering the channel. Any spilled liquids which do enter the channel, for example at the ends of the channel cover, are drained from the channel by making the floor of the channel peaked near its center and sloped downwardly toward drainage slots formed at both ends of the channel.

10 Claims, 5 Drawing Sheets

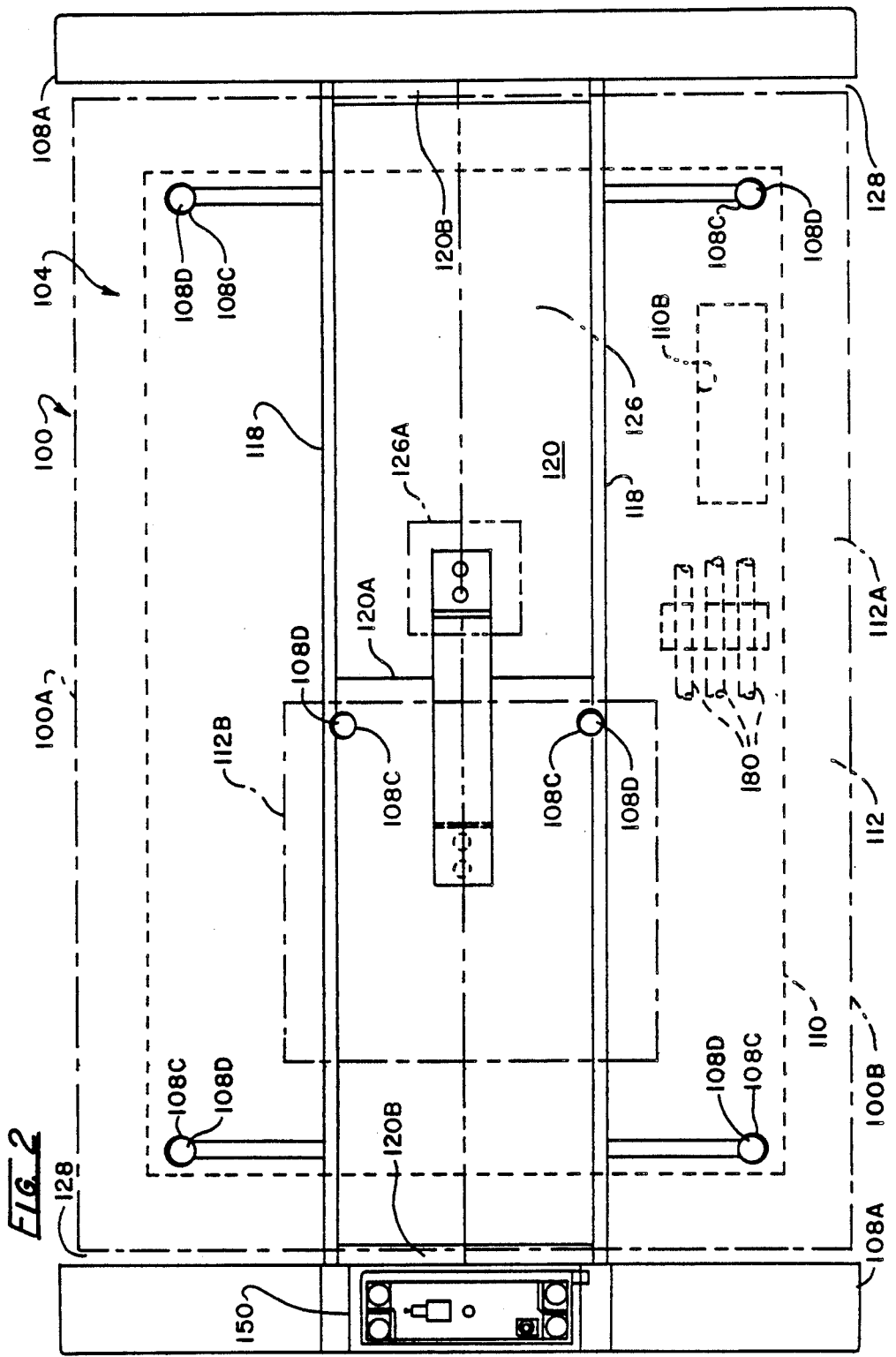

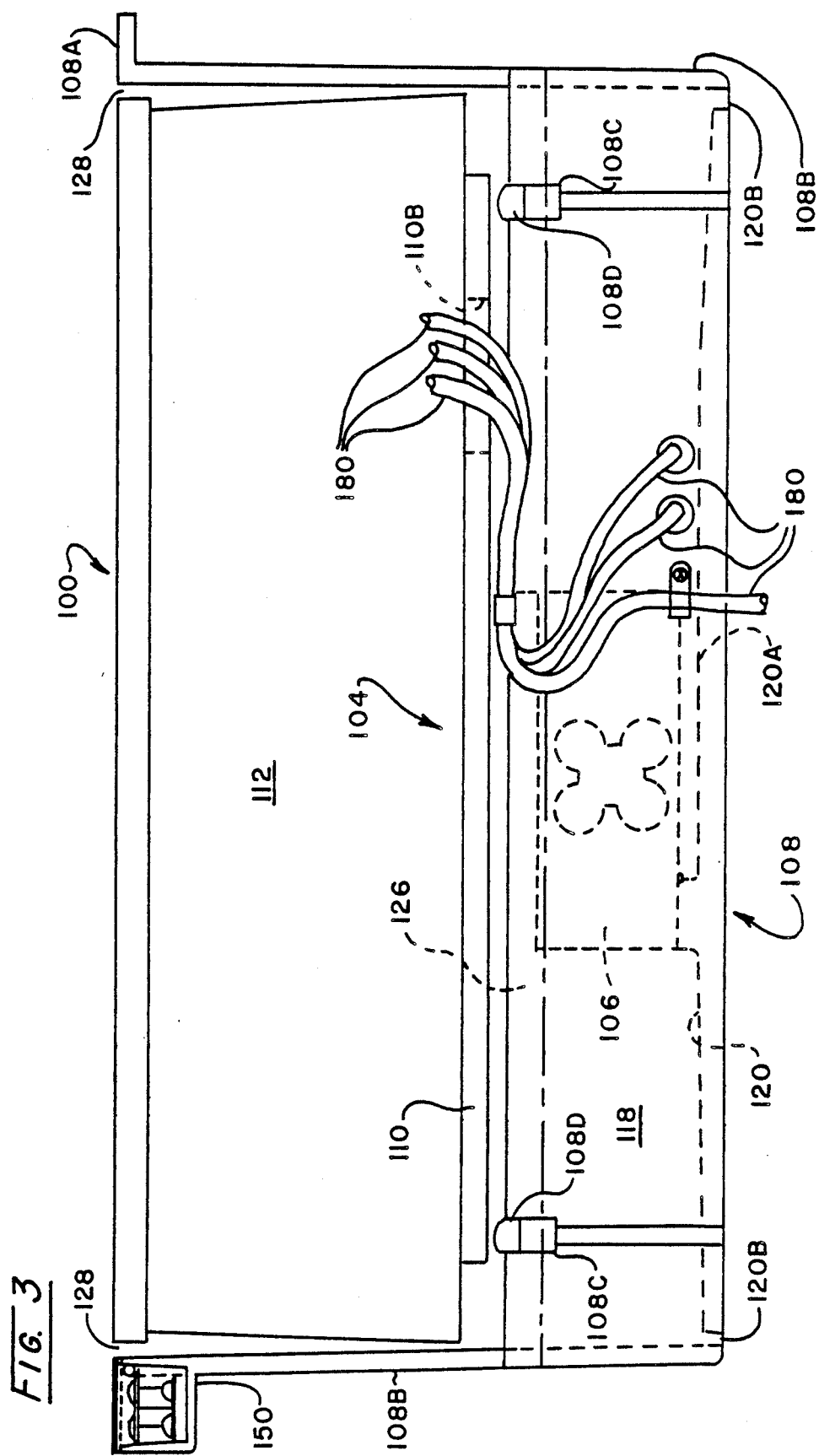

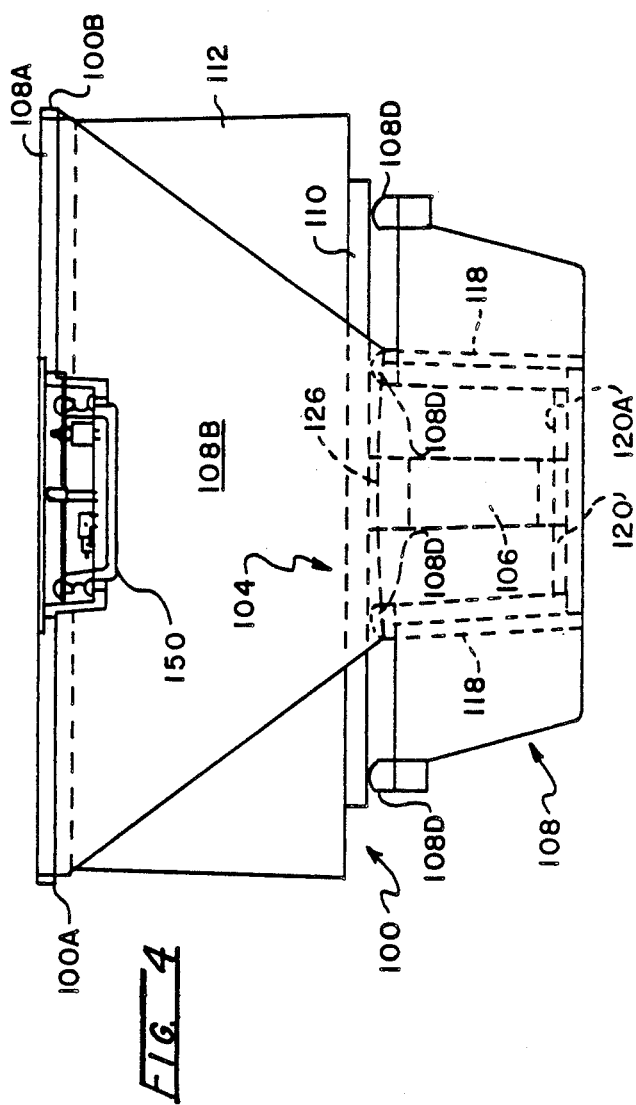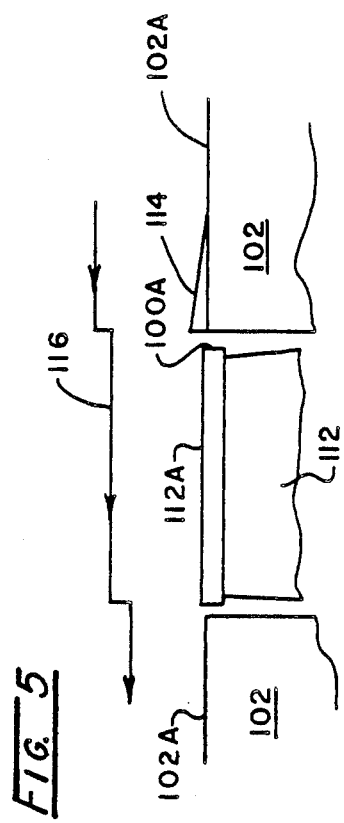

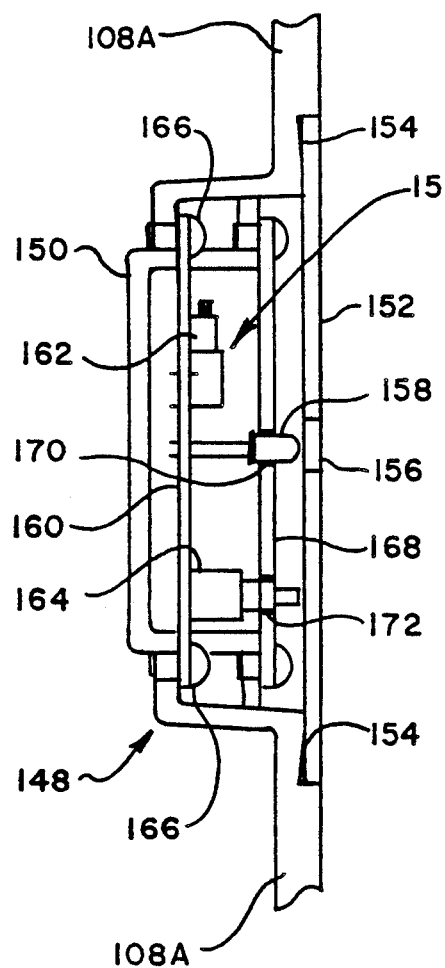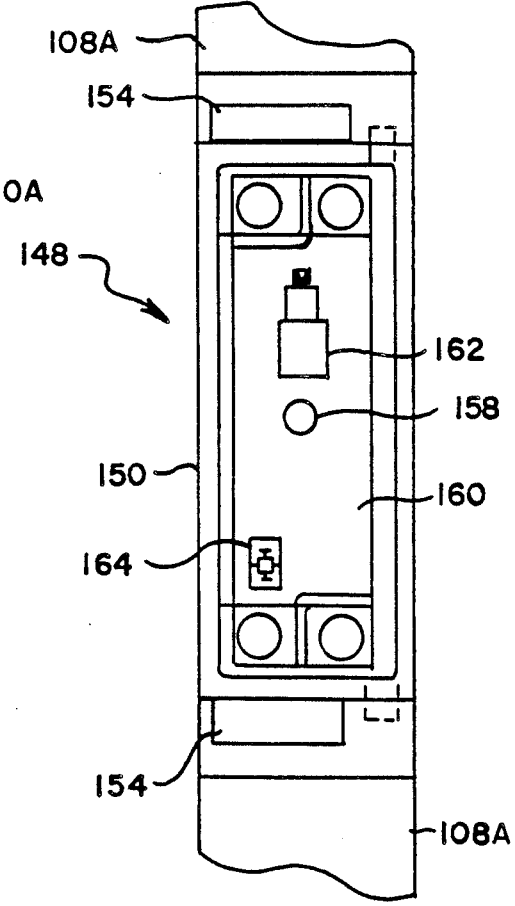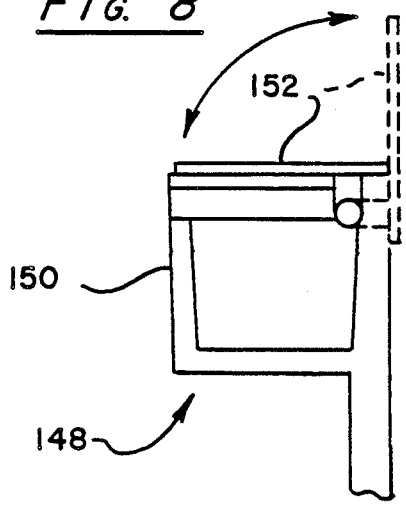

SPILL CONTROL MOUNTING FOR DATA GATHERING SYSTEM

CROSS REFERENCE TO RELATED APPLICATIONS

The present application is related to the following U.S. patent applications which were filed on even date herewith: Data Gathering System Including Cradle Suspension, Ser. No. 328,178: Method and Apparatus for Mounting Data Gathering System, Ser. No. 328,229: Scale Calibration/Zeroing in Data Gathering System, Ser. No. 328,188: Data Gathering System Housing-/Mounting, Ser. No. 328,465: and, Point-of-Sale Data Gathering System, Ser. No. 328,272.

BACKGROUND OF THE INVENTION

The present invention relates generally to data gathering systems for installation in point of sale checkout counters and, more particularly, to a spill control mounting for such a data gathering system Which mounting diverts liquids spilled on the system to the floor therebeneath without contaminating or affecting system operation.

Supermarket checkout counters commonly include optical scanners mounted therein for optically scanning bar code labels on products to be purchased as the products are moved over scanning windows in the top surfaces of the scanners. The scanners read and convert bar code labels into product identification and pricing information which is used for sales and other merchandising purposes, such as inventory control. Since many products sold in supermarkets, for example produce, are sold by weight, weighing scales are also often required or desireable at checkout counters. Ideally, the weighing scales and the optical scanners are integrated into data gathering systems which are mounted within the checkout counters to save space and the time of sales personnel using the systems.

One example of such a data gathering system is disclosed in U.S. Pat. No. 4,656,344, wherein a scale and an optical scanner are integrated into a single unit which fits within the checkout counter. While this integrated scale/scanner system provides sales personnel with in-the-counter weighing and scanning capabilities, still there are disadvantages and inconveniences associated with the integrated system. For example by making the scale and scanner a single integrated unit, the system is heavy and difficult to install and/or remove from a receiving checkout counter. While access panels can be provided in the checkout counter, if they are not, the problem is aggravated since the system otherwise must be removed from the checkout counter each time the scale is to be repaired or calibrated and then the system must be reinstalled.

Further, while the disclosed data gathering system of the referenced patent provides for drainage of liquids spilled on the system to a collection area via a plastic chute at the bottom of the system, the path to the chute passes over load cells of the scale of the system. In view of liquids which may be spilled in a supermarket, e.g. milk, soft drinks, syrups, cleaning fluids, bleaches, juices and the like, the drainage path appears to be potentially hazardous to the scale and to require frequent cleaning of the system or otherwise such spills could result in scale errors. Here again, cleaning of the system requires removal, disassembly and reinstallation of a heavy system which is difficult and awkward to handle.

Accordingly, there is a need for a mounting arrangement for a data gathering system for use in a point of sale checkout counter which provides spill control for routing spilled liquids away from the data gathering system via a path which bypasses any portion of the system which might be damaged by the liquids or whose operating characteristics might be affected by the liquids.

SUMMARY OF THE INVENTION

This need is met by a spill control mounting arrangement in accordance with the present invention for a data gathering system which is installed within a checkout counter. In its broadest aspect, the mounting arrangement comprises configuring the data gathering system in two parts a first part of the system being mounted below an upper surface of the counter and a second part of the system being supported thereon to bring the system substantially up to the surface of the counter. The footprint of the first part of the system being smaller than the footprint of the second part such that the first part is substantially shielded from spilled liquids by the second part which is constructed to be impervious to such liquids. In particular, the first part may comprise a mounting channel extending across the counter and being substantially narrower than the second part, approximately one third the width. Components of the data gathering system are mounted within the channel for mechanical protection as well as protection from spilled liquids. A crowned channel cover can also be provided to prevent a substantial portion of any spilled liquids from entering the channel. Any spilled liquids which do enter the channel, for example at the ends of the channel cover, are drained from the channel by making the floor of the channel peaked near its center and sloped downwardly toward drainage slots formed at both ends of the channel.

In accordance with one aspect of the present invention, a spill control mounting for a data gathering system inserted into a checkout counter which reads coded labels on products scanned by the system and determines the weights of products placed on the system comprises support means for suspending the data gathering system within the checkout counter. Scale means are positioned below an upper surface of the checkout counter and secured to the support means for determining the weights of products placed on the system. Optical scanning means having a width and a length is provided for reading the coded labels, the optical scanning means having an upper surface including an optical scanning window through which scanning light beams pass and being supported upon the scale means and vertically positioned such that its upper surface is substantially aligned with the upper surface of the counter to define a weighing platter for the scale means. The optical scanning mean thus shields the support means and the scale means whereby liquids spilled on the system flow over the optical scanning means and are substantially diverted away from the support means and the scale means.

The support means may comprise a support cradle adapted to be hung from the checkout counter and having a width substantially less than the width of the optical scanning means. The support cradle preferably defines a channel extending laterally across the checkout counter and the spill control mounting may further comprise a channel cover extending across the channel. For best protection, the channel cover is crowned such that a substantial portion of any liquid spilled thereon will run off to the sides of the channel. For protection against any spilled liquids which may get past the channel cover, the spill control mounting may further comprise a channel floor and drainage means in the channel floor which is peaked near its center and sloped downwardly toward the drainage means such that any liquid spilling into the channel is directed to the drainage means which preferably comprises a drainage slot formed at each end of the channel.

In accordance with another aspect of the present invention a spill control mounting for a two part data gathering system for determining information relating to products to be purchased and inserted into a checkout counter defining an upper surface upon which products are placed for access to the data gathering system comprises support means for suspending the data gathering system within the checkout counter. A first part of the data gathering system is secured to the support means and suspended a defined distance below an upper surface of the checkout counter. A second part of the data gathering system is supported upon the first part and extends thereabove by the defined distance to extend the data gathering system into substantial alignment with the upper surface of the checkout counter. The second part also extends beyond the first part on at least two sides thereof to shield the support means and the first part whereby liquids spilled on the system flow over the second part and are substantially diverted away from the support means and the first part.

The support means may comprise a support cradle adapted to be hung from the checkout counter with the support cradle having a width substantially less than the width of the second part. The support cradle preferably defines a channel extending laterally across the checkout counter and the spill control mounting may further comprise a channel cover extending across the channel, the channel cover being crowned such that a substantial portion of any liquid spilled thereon will run off to the sides of the channel. For protection against any spilled liquids which may get past the channel cover, the spill control mounting may further comprise a channel floor and drainage means in the channel floor which is peaked near its center and sloped downwardly toward the drainage means such that any liquid spilling into the channel is directed to the drainage means Which preferably comprises a drainage slot formed at each end of the channel.

It is an object of the present invention to provide an improved spill control mounting arrangement for a data gathering system for use in a checkout counter wherein the system is configured as two parts with one part which is substantially impervious to spilled liquids being mounted such that it substantially shields the other part of the system: to provide an improved spill control mounting arrangement for a data gathering system for use in a checkout counter wherein a portion of the system is mounted within a protecting channel extending across the counter and another portion of the system is supported thereon to substantially shield and protect the channel and the system portion mounted therein from spilled liquids: and, to provide an improved spill control mounting arrangement for a data gathering system for use in a checkout counter wherein a portion of the system is mounted within a protecting channel extending across the counter and another portion of the system is supported thereon to substantially shield and protect the channel and the system portion mounted therein from spilled liquids with the channel being further protected by a crowned channel cover and the system portion mounted within the channel being additionally protected by a drainage arrangement within the channel.

Other objects and advantages of the invention will be apparent from the following description the accompanying drawings and the appended claims.

BRIEF DESCRIPTION OF THE DRAWINGS

FIGS. 2-4 are top, side and end views, respectively, of the data gathering system of FIG. 1;

FIG. 5 is a schematic side view of the upper surface of a checkout counter including the data gathering system of FIG. 1 and showing a trim strip for defining a preferred product flow path; and FIGS. 6-8 illustrate a preferred calibration and zeroing arrangement for the scale of the data gathering system.

DETAILED DESCRIPTION OF THE INVENTION

Figure 1:
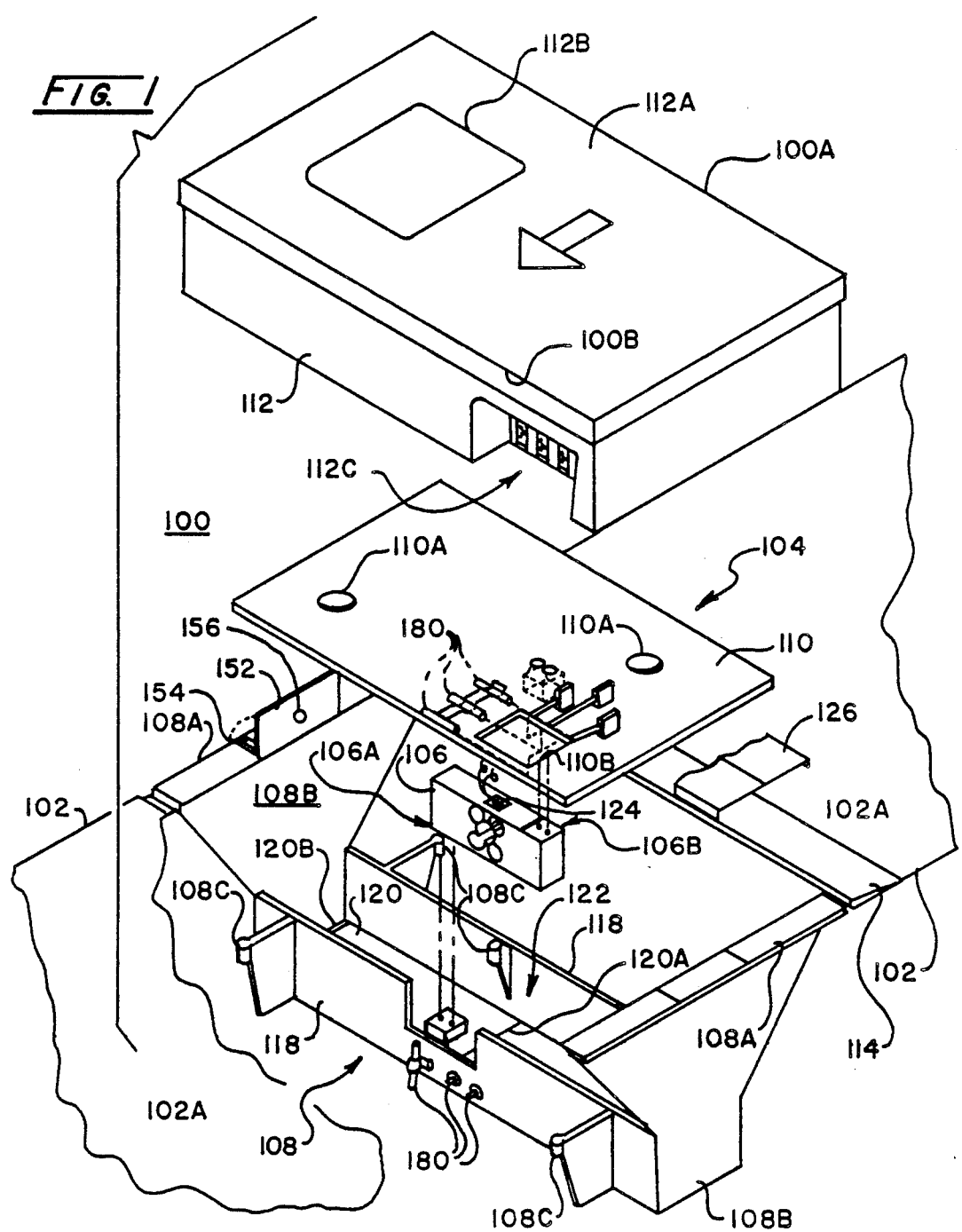
FIG. 1 is an exploded perspective view of a data gathering system for use in a checkout counter which is mounted in accordance with the present invention.

While generally applicable to data gathering systems and the like mounted within a counter the spill control mounting of the present invention is particularly applicable to a combined two part data gathering system which comprises a scale mounted within the counter and an optical scanner rested upon a load receiving plate or subplatter of the scale such that bar coded labels on products can be read by the optical scanner and the weight of such products can also be determined by placement on the optical scanner. Accordingly, the mounting will be described With reference to such a combined two part system.

Reference is now made to the drawings which show a data gathering system 100 in accordance with the present invention which is designed for use in a point of sale checkout counter 102. The data gathering system 100 is designed to be fitted entirely within the counter 102 and is structured as two separate units which can be independently manufactured, tested, packaged and shipped and also individually handled and installed. By structuring the system as two separate units, it initially can be easily installed in the counter 102 and thereafter easily removed and reinstalled for system maintenance and repair. Further, the scanning operation can be more easily and accurately performed since scanning light beams pass directly from the scanner as opposed to passage through secondary windows and/or apertures as in prior art systems wherein a scale platter is required above the top of the scanner. The data gathering system 100 conveniently provides for both reading bar-coded labels secured to products to be purchased and also weighing products which are placed upon the upper surface of the system.

The data gathering system 100 comprises scale means taking the form of a load cell scale 104 in the illustrated embodiment, which is supported within the checkout counter 102 by support means and provides for determining weights of products presented to the data gathering system 100. The scale 104 comprises a cantilever beam load cell 106 secured at one end 106A to the support means which comprises a support cradle 108 in the illustrated embodiment, and to a load receiving plate or subplatter 110 at its opposite end 106B. The subplatter 110 is located below the upper surface 102A of the checkout counter 102 as best shown in FIGS. 3 and 4.

Optical scanning means comprising a self-contained optical scanner 112 is rested upon the scale subplatter 110 for reading coded labels, such as bar-coded labels, on products presented for purchase at the checkout counter 102. The optical scanner 112 has an upper surface 112A including an optical scanning window 112B through which scanning light beams pass. The optical scanning window 112B is flush with the remainder of the upper surface 112A such that the window 112B and upper surface 112A are easy to clean. The remainder of the upper surface 112A defines a weighing area adjacent to the window 112B which receives the majority of items to be weighed such that debris from those items will not fall on the window 112B tending to keep it clean.

The optical scanner 112 is sized and vertically positioned such that its upper surface 112A is substantially aligned with the upper surface 102A of the checkout counter 102 when the optical scanner 112 is rested upon the scale subplatter 110. The weight of the optical scanner 112 and associated cabling is, like that of the subplatter 110, zeroed out in establishing the scale zero reading during calibration or treated as a tare weight for the scale 104. Thus the upper surface 112A of the optical scanner 112 serves as the scale weighing platter for receiving products to be weighed and only the product weights are included in the weight readings.

The scale subplatter 110 and scanner 112 include scanner locator means comprising two raised circular bosses 110A on the subplatter 110 which are received by corresponding indentations (not shown) formed into the bottom of the optical scanner 112 in the illustrated embodiment. The scanner locator means provide for positioning and horizontally stabilizing the optical scanner 112 on the scale subplatter 110 for assembly and operation of the data gathering system 100. Alternately, bosses or pins could be formed on the scanner 112 with matching identations or holes on the subplatter 110 or combinations of bosses and matching indentations could be formed on both the scanner 112 and the subplatter 110. Of course, differently shaped bosses or different locating means can be provided as will be apparent to those skilled in the art.

The data gathering system 100 may be positioned within the checkout counter 102 such that the upper surface 112A of the optical scanner 112 is slightly above the upper surface 102A of the counter 102 as best shown in FIGS. 1 and 5. This positioning of the data gathering system 100 within the counter 102 combined with a tapered trim strip 114 defines a downwardly stepped path illustrated by the arrow 116 shown in FIG. 5 for products to be processed by the system. The tapered trim strip 114 is secured across the checkout counter 102 adjacent the entry side 100A of the data gathering system 100 to slightly elevate the upper surface 102A of the counter 102 above the upper surface 112A of the system.

The trim strip 114 is shown as having exaggerated thickness in FIG. 5; however, it can be quite thin, as thin as 0.040–0.080 inch depending upon the stiffness of the scale 104, and yet provide smooth passage of products across the data gathering system 100. The downwardly stepped path for products processed by the system is important since the smooth upper surface 112A of the scanner 112 permits products to be slid thereacross by a sales clerk using the data gathering system 100. If a downwardly stepped path is not provided products may catch at the entry side 100A and potentially at the exit side 100B of the system inconveniencing the sales clerk and substantially reducing this attractive feature of the system.

The support means or support cradle 108 is adapted to be hung from the checkout counter 102 by means of support flanges 108A which extend from end plates 108B of the support cradle 108 to freely suspend the system 100 within the counter 102. The end plates 108B are separated from one another by a distance which is preferably substantially equal to the length of the scanner 112 plus $\frac{1}{4}$ inch such that with the scanner 112 centered therebetween, a $\frac{1}{8}$ inch air gap is maintained at each end of the scanner. Similar sizing/spacing is defined at the entry and exit sides 100A, 100B of the system, see FIGS. 2 and 3.

Such spacing is important since the upper surface of the system defining the scale weighing platter must be free to deflect vertically without contact with the counter to ensure accurate weights. In the prior art, problems have been encountered due to irregularities or insufficient length or width of the counter openings which can result in improper installation and weights. Problems can also be created in the prior art due to lateral movement of the scale caused by placing or sliding products over the scale platter. Such problems are substantially eliminated by the present system. It should be apparent that the counter 102 can be adapted to support the data gathering system 100 from the support flanges 108A such that the system can be precisely located relative to the counter 102 with convenient adjustment, if necessary, being provided by shims or otherwise. The data gathering system loop may be maintained in position by interengagement of the support flanges 108A with the counter 102 or a variety of fastener devices can be employed if desired as will be apparent to those skilled in the art.

The support cradle 108 comprises at least two scale subplatter stop members 108C six stop members 108C being included in the illustrated embodiment as best shown in FIGS. 1 and 2, positioned to engage the subplatter 110 at the maximum allowable extent of its travel to thereby prevent potentially damaging overload of the load cell 106. Preferably, stop pads 108D made of hardened tool steel are formed at the upper surfaces of the stop members 108C as shown in FIGS. 2-4.

The support cradle 108 comprises generally vertical side walls 118 and a bottom wall 120 which define a channel 122 extending laterally across the checkout counter 102 for receiving and protecting the load cell 106 and electrical circuitry (not shown) which is connected to and operable with one or more force transducers, such as strain gauges 124, see FIG. 1, of the load cell 106 in accordance with well known weighing scale technology. The bottom wall 120 is peaked near its center 120A such that it gradually tapers downwardly toward the end plates 108B of the support cradle 108 adjacent which the bottom wall 120 terminates in open slots 120B. A crowned channel cover 126, shown in FIGS. 1-4, includes an opening 126A through which the load cell 106 is connected to the scale subplatter 110, see FIG. 2.

This support arrangement or mounting for the data gathering system 100 is preferred since it provides improved spill control over the prior art. In particular, any spilled liquids which flow over the entry side 100A or exit side 100B of the system will flow harmlessly down the sides of the optical scanner 112 to the floor beneath the system where it can be periodically or immediately attended to through access panels (not shown) in the counter 102. Spilled liquids which flow down the ends of the system are limited to some extent by the narrow slots 128 between the optical scanner 112 and the support flanges 108A/end plates 108B of the support cradle 108, see FIGS. 2 and 3. Further, the majority of such liquid will also flow harmlessly to the floor beneath the system due to the narrowness of the width of the channel 122 which is approximately one third of the width of the data gathering system 100. The remaining small portion of spilled liquid which passes through the narrow slots 128 will initially engage the crowned channel cover 126 and be diverted to the sides of the channel 122 and once again to the floor beneath the system.

Any spilled liquid which does manage to seep past the channel cover 126 will flow down the interior surfaces of the end plates 108B and/or be diverted by the tapered bottom wall 120 to pass to the floor beneath the system through the slots 120B. Spilled liquids are thus eliminated from the data gathering system 100 by paths which do not tend to interfere with the movement and hence the operation of the scale 104 of the system. While liquids, particularly thick liquids, may tend to accumulate on the optical scanner walls and change the zero setting of the scale 104, this creates no problem since the scale 104 can be conveniently calibrated and/or automatically or manually zeroed without removal of the system 100 from the counter 102 as will now be described.

The data gathering system 100 includes scale adjusting means comprising a scale calibrating/zeroing system 148 which is integrated into one of the support flanges 108A. The calibrating/zeroing system 148 is enclosed in a housing 150 as generally shown in FIGS. 1-4 and best shown in FIGS. 6-8 wherein various elements of the system are not shown in all the drawing figures for ease of description and illustration. The housing 160 is covered by a hingedly mounted door 152 formed of a ferromagnetic material and maintained in its closed position by magnets 154 embedded within the support flange 108A and includes a window 156 through which a light source such as a light emitting diode (LED) 158 visibly signals a sales clerk using the data gathering system 100 or other personnel servicing the system. Other housing closures such as snap fitting latches and the like Will be apparent to those skilled in the art for use in the present invention.

Mounted within a chamber 150A, see FIG. 6, of the housing 150 is a circuit board 160 to which is mounted a scale calibration switch 162, the LED 158 and a scale zeroing switch 164. The circuit board 160 is secured within the chamber 150A of the housing 150 by screws 166 or other appropriate fastening devices. A cover panel 168, see FIG. 6, is secured and preferably sealed in the upper part of the housing 150 to form an upper wall of the chamber 150A. The cover panel 168 includes apertures 170 and 172 through which the LED 158 and the zeroing switch 164 protrude, respectively. A lighted switch could be used, if desired, to replace the LED 158 and the zeroing switch 164 for a potentially simplified user interface. In any event, the panel 168 thus permits access to the zeroing switch 164 if the door 152 is opened by a sales clerk or other authorized person to permit convenient zeroing or rezeroing of the scale 104; however, the panel 168 prevents access to the calibration switch 162 which should only be operated by service personnel on a periodic basis. After calibration, the panel 168 would be sealed in accordance with requirement of local weights and measures.

In accordance with the calibrating/zeroing system 148 of the data gathering system 100, if the scale 104 indicates a weight other than zero when nothing is present on the upper surface 112A of the optical scanner 112, the operator can zero the scale 104 by activating the scale zeroing switch 164 after opening the door 152. Zero drifts may be caused, for example, by the accumulation of debris on the extended optical-scanner/weighing-platter combination. Also, to ensure accurate weighing operations, the scale 104 is periodically calibrated or recalibrated by authorized service personnel. However, in this system, as opposed to the prior art, the service person merely has to open the door 152, remove the weights and measures seal and the cover panel 168, and depress the calibration switch 162 to initiate the calibration operation.

Accordingly, the data gathering system 100 does not have to be removed from the counter 102 for such standard maintenance operations. The LED 158 is used to signal the operator that service is required and to assist in performing the service which is required. For example the LED 158 may be lighted to advise the operator that the scale 104 is zeroed and extinguished if the scale 104 drifts out of zero. For calibration, the lighting of the LED 158 can be controlled to advise the service person that steps of a calibration operation have been properly performed.

As an example of a calibration routine for a scale having a 30 pound (15 kg) capacity, a precision weight of 20 pounds (10 kg) and zero weight may be used. Initially, the calibration switch 162 is depressed to start the calibration routine. The LED 158 will begin to blink indicating the calibrate mode. A service person ensures that no weight is present on the optical-scanner/weight-platter and then depresses the zeroing switch 164. Once this step is successfully completed, the LED 158 is lighted for approximately 5 seconds and then begins blinking again to signal the service person to place the 20 pound (10 kg) weight on the center of the optical-scanner/weighing-platter and press the zeroing switch 164. The LED 108 will then extinguish for approximately 5 seconds and then light steadily when calibration is completed. From these two known data points, the scale 104 can generate accurate weight signals for products placed on the upper surface 112A of the optical scanner 112. Of course, alternate calibration and zeroing techniques can be used in the calibrating/zeroing system disclosed.

To prevent interference with operation of the scale 144, cables for conducting electrical signals and power between the optical scanner 112 and the scale 104 of the data gathering system 100 are formed and secured to the scale 104 during its manufacture. More particularly, cables 180 are sized such that they extend between and are secured to the scale subplatter 110 and one of the side walls 118 of the channel 112 such that the cables 180 permit free deflection of the load cell 106 but do not affect such deflection, see FIGS. 1-3. By thus sizing and routing the cables 180 such that they do not affect the deflection of the load cell 106, the weight of the cables 180 can be compensated during calibration of the scale 104. This cabling arrangement is important since cables to the optical scanner 112 must be routed through the scale subplatter 110 via an opening 110B therethrough. The cables 180 include sufficient slack to permit quick and easy installation and removal of the scanner 112. The cables 180 are then routed up to a vestibule 112C on the scanner 112 and connected to the appropriate connectors therein.

Having thus described the data gathering system of the present invention in detail and by reference to preferred embodiments thereof, it will be apparent that modifications and variations are possible without departing from the scope of the invention defined in the appended claims.

What is claimed is:

1. In a data gathering system inserted into a checkout counter for reading coded labels on products scanned by the system and for determining the weight of products placed on the system, a spill control mounting comprising:
   support means for suspending said data gathering system within said checkout counter;
   scale means positioned below an upper surface of said checkout counter and secured to said support means for determining said weights; and
   optical scanning means having a width and a length for reading said coded labels, said optical scanning means being constructed to be substantially impervious to liquids which may be inadvertently spilled upon said data gathering system, having an upper surface including an optical scanning window through which scanning light beams pass, being supported upon said scale means and vertically positioned such that its upper surface is substantially aligned with the upper surface of said counter to define a weighing platter for said scale means and to shield said support means and said scale means, and being spaced from said counter for free movement of said platter and to receive spilled liquids between said optical scanning means and said counter whereby liquids spilled on said data gathering system flow over said optical scanning means and between said optical scanning means and said counter to be substantially diverted away from said support means and said scale means.

2. A spill control mounting as claimed in claim 1 wherein said support means comprises a support cradle adapted to be hung from said checkout counter, said support cradle having a width substantially less than the width of said optical scanning means.

3. A spill control mounting as claimed in claim 2 wherein said support cradle defines a channel extending laterally across said checkout counter and further comprising a channel cover extending across said channel, said channel cover being crowned such that a substantial portion of any liquid spilled thereon will run off to the sides of said channel.

4. A spill control mounting as claimed in claim 3 further comprising a channel floor and drainage means in said channel floor which is peaked near the center of said floor and sloped toward said drainage means such that any liquid spilling into said channel is directed to said drainage means.

5. A spill control mounting as claimed in claim 4 wherein said drainage means comprises a drainage slot formed at each end of said channel.

6. In a two part data gathering system inserted into a checkout counter to determine information relating to products to be purchased, said counter defining an upper surface upon which products are placed for access to said data gathering system, a spill control mounting comprising:
   support means for suspending said data gathering system within said checkout counter;
   a first part of said data gathering system being secured to said support means and suspended a defined distance below an upper surface of said checkout counter; and
   a second part of said data gathering system being supported upon said first part and extending thereabove by said defined distance to extend said data gathering system into substantial alignment with the upper surface of said checkout counter, said second part also extending beyond said first part on at least two sides thereof, being constructed to be substantially impervious to liquids which may be inadvertently spilled upon said data gathering system to shield said support means and said second part, and being spaced from said counter to receive spilled liquids between said second part and said counter whereby liquids spilled on said data gathering system flow over said second part and between said second part and said counter to be substantially diverted away from said support means and said first part.

7. A spill control mounting as claimed in claim 6 wherein said support means comprises a support cradle adapted to be hung from said checkout counter, said support cradle having a width substantially less than the width of said second part.

8. A spill control mounting as claimed in claim 7 wherein said support cradle defines a channel extending laterally across said checkout counter and further comprising a channel cover extending across said channel, said channel cover being crowned such that a substantial portion of any liquid spilled thereon will run off to the sides of said channel.

9. A spill control mounting as claimed in claim 8 further comprising a channel floor and drainage means in said channel floor which is sloped toward said drainage means such that any liquid spilling into said channel is directed to said drainage means.

10. A spill control mounting as claimed in claim 9 wherein said drainage means comprises a drainage slot formed at each end of said channel.

* * * * *

UNITED STATES PATENT AND TRADEMARK OFFICE
CERTIFICATE OF CORRECTION

PATENT NO. : 4,991,692

DATED : February 12, 1991

INVENTOR(S) : Nojiri et al

It is certified that error appears in the above-identified patent and that said Letters Patent is hereby corrected as shown below:

| | | |
|---|---|---|
| Col. 1, Line 22 | "system  Which mounting" should be --system which mounting--. |
| Col. 1, Line 49 | "For example," should be --For example--. |
| Col. 2, Line 18 | "parts a" should be --parts, a first--. |
| Col. 3, Line 48 | "means Which" should be --means which--. |
| Col. 3, Line 57 | "system:" should be --system;--. |
| Col. 3, Line 64 | "spilled liquids:" should be --spilled liquids;--. |
| Col. 4, Line 38 | "described With" should be --described with--. |
| Col. 4, Line 61 | "scale means" should be --scale means,--. |
| Col. 5, Line 28 | "Thus the upper" should be --Thus, the upper--. |
| Col. 5, Line 42 | "110 or" should be --110, or--. |
| Col. 6, Line 36 | "system loop may" should be --system 100 may--. |
| Col. 7, Line 42 | "housing 160 is" should be --housing 150 is--. |
| Col. 8, Lines 4&5 | "requirement" should be --requirements--. |
| Col. 8, Lines 26&27 | "For example" should be --For example,--. |
| Col. 8, Line 46 | "The Led 108" should be --The Led 158--. |
| Col. 8, Line 55 | "144," should be --104,--. |
| Col. 8, Line 62 | "channel 112" should be --channel 122--. |

UNITED STATES PATENT AND TRADEMARK OFFICE
CERTIFICATE OF CORRECTION

PATENT NO. : 4,991,692

DATED : February 12, 1991

INVENTOR(S) : Howard H. Nojiri, et al.

It is certified that error appears in the above-identified patent and that said Letters Patent is hereby corrected as shown below:

Column 8, line 62, "channel 112" should be --channel 122--.

Signed and Sealed this

Twelfth Day of January, 1993

Attest:

DOUGLAS B. COMER

Attesting Officer

Acting Commissioner of Patents and Trademarks